P. WEEKS.
TRACTOR.
APPLICATION FILED APR. 21, 1913. RENEWED MAR. 15, 1916.
1,198,494.
Patented Sept. 19, 1916.
2 SHEETS—SHEET 1.
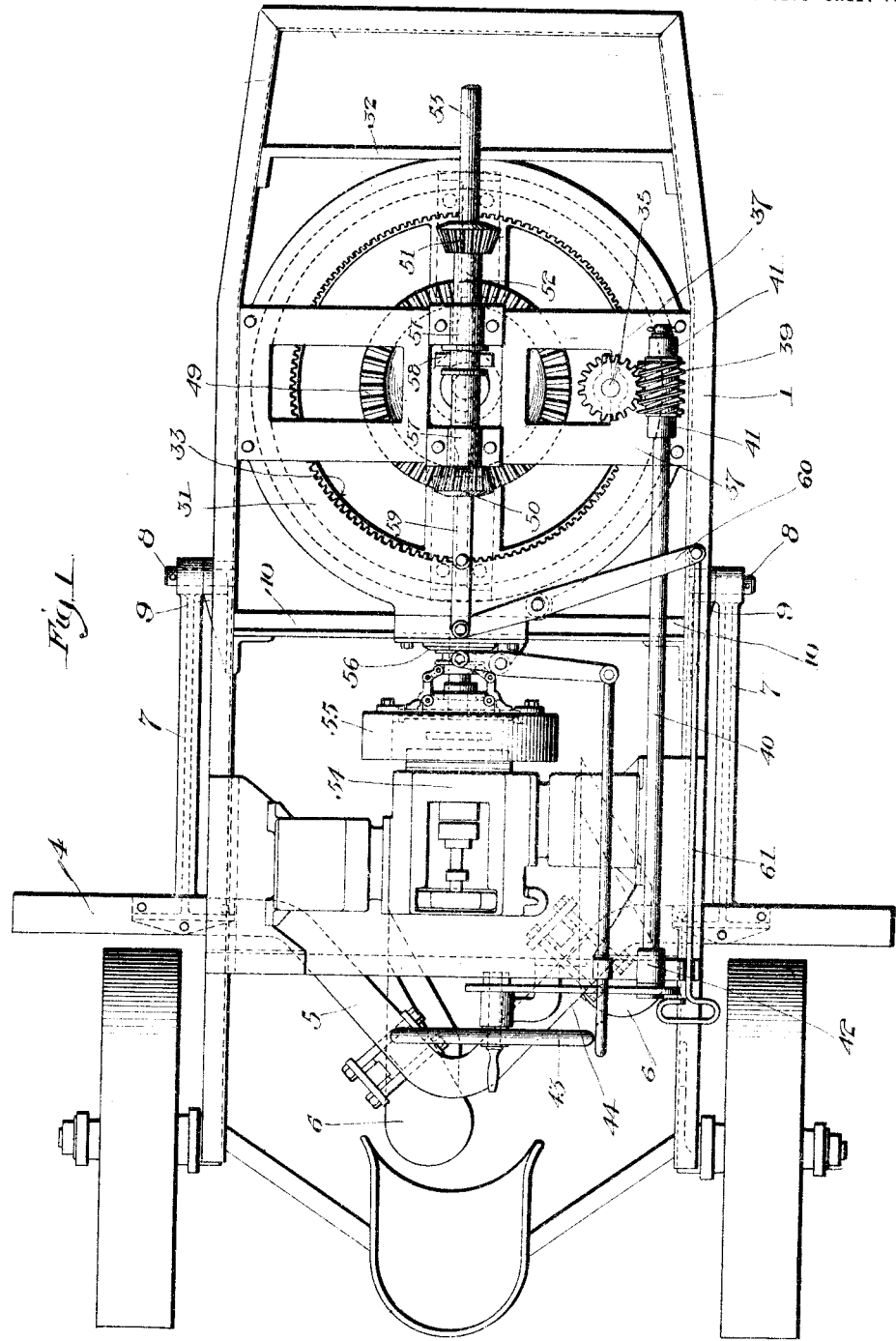

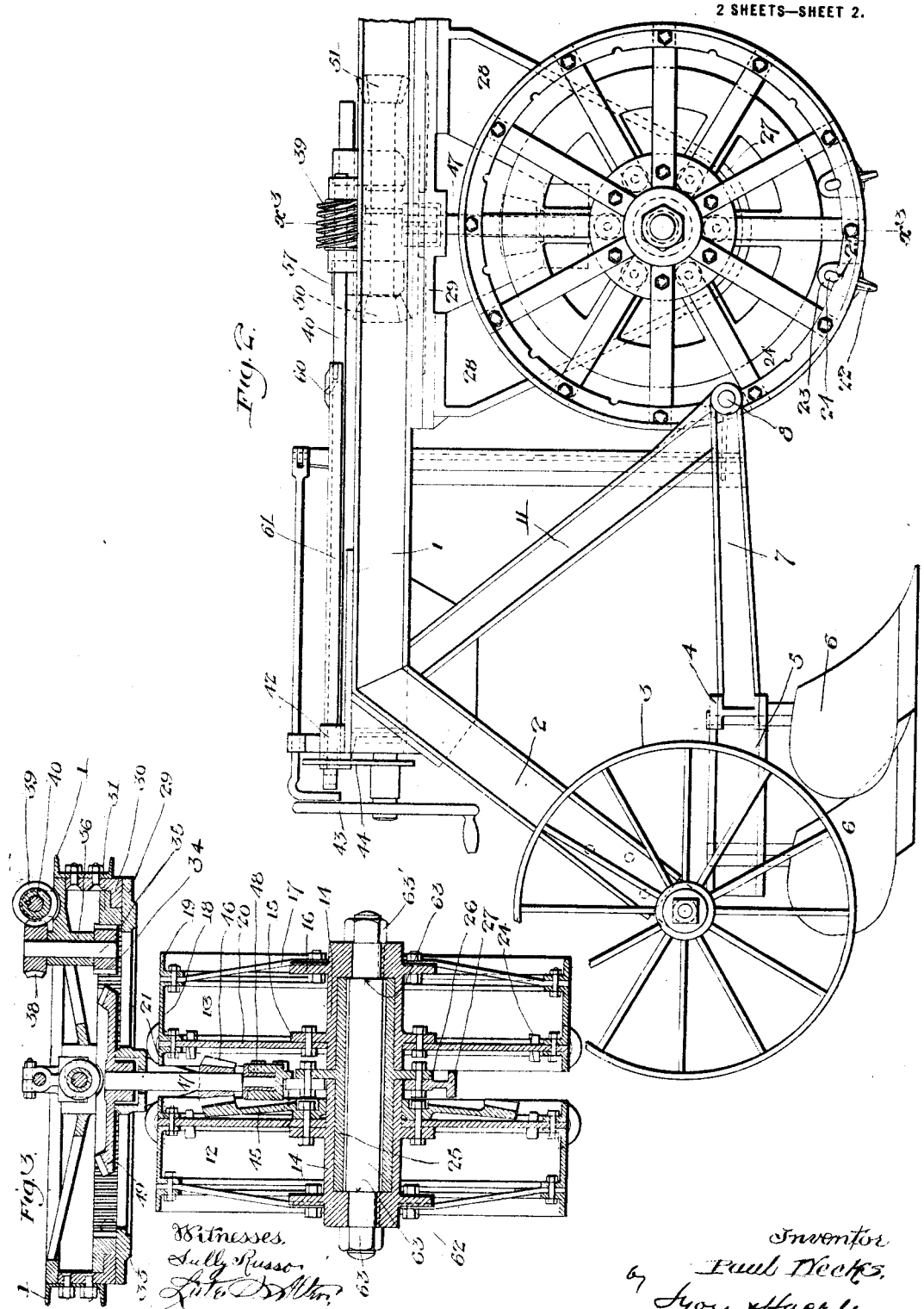

UNITED STATES PATENT OFFICE.

PAUL WEEKS, OF LOS ANGELES, CALIFORNIA.

TRACTOR.

1,198,494.     Specification of Letters Patent.    Patented Sept. 19, 1916.

Application filed April 21, 1913, Serial No. 762,722. Renewed March 15, 1916. Serial No. 84,449.

*To all whom it may concern:*

Be it known that I, PAUL WEEKS, a citizen of the United States, residing at Los Angeles, in the county of Los Angeles and State of California, have invented a new and useful Tractor, of which the following is a specification.

This invention relates to a tractor designed for operating plows or other implements or drawing vehicles, and one object of the invention is to provide a three-wheeled structure by locating the two front wheels so close together, and rigidly connected with each other, that they form a single wheel, capable of being readily swiveled in either direction to steer the tractor, and to drive the said front wheel at a point between the two members thereof.

A further object is to provide for turning the said front wheel members as a unit transversely of the tractor, without disturbing the continuous driving of the front wheel member.

Other objects and advantages will appear from the following description.

Referring to the drawings: Figure 1 is a plan view. Fig. 2 is a side elevation with a small portion of the machine removed. Fig. 3 is a vertical section on line $x^3$—$x^3$, Fig. 2.

1 designates the upper main frame with downwardly directed rear members 2, supported by a pair of rear wheels 3.

4 is a cross bar with an angular center portion 5 to which are attached plows 6. The cross bar 4 has forwardly extending arms 7 pivoted to trunnions 8 which project from brackets 9 on a cross bar 10 and braced by struts 11. Any other implement or device to be drawn may be secured to the cross bar 4 in lieu of the plows 6.

Under the front end of the frame 1 are two wheel members 12 and 13 and each wheel member consists of a hollow sleeve hub 14 having an inner flange 15 and an outer flange 16. Bolted to the outer flange 16 are bent spokes 17, the outer ends of which are bolted between a central circular channel ring 18 and an outer circular angle ring 19, while straight spokes 20 are bolted at their inner ends to flange 15, and at their outer ends are bolted between the central channel ring 18 and an inner angle ring 21. The rings 18, 19 and 21 have their outer surfaces flush and together form the rim of the wheel. Any desired device may be secured to the rim for increasing the traction, as, for example, the blades 22 which are arranged transverse of the rim, each blade 22 having a central web 23 which extends radially inward through the space between the rings 18 and 19 or 21, and is secured by a cross key 24 which engages notches 24′ formed in the flanges of the adjacent rings.

The sleeve hubs 14 are mounted to rotate on a stationary inner sleeve bearing 25 which has a central flange 26 bolted to a web 27 which extends around the sleeve bearing between the wheel members 12 and 13, and has two upwardly diverging webbed arms 28 which are secured to a fifth wheel 29 mounted to rotate underneath a stationary flanged ring 30, the fifth wheel 29 having a flanged ring 31 secured to its upper side which engages the flanged ring 30, securely locking the fifth wheel 29 thereto and permitting revolution thereon. The stationary ring 30 is secured to the side frame members 1, as clearly shown in Fig. 3, and also to the cross bar 10 and to a cross bar 32. The ring 31 is formed with an internal gear 33 and meshing therewith is a pinion 34 mounted on a shaft 35 journaled in a bearing 36 which is formed on a cross bar 37. On the upper end of the shaft 35 is a worm gear 38 which meshes with a worm 39 on a shaft 40, the shaft 40 being mounted in bearings 41 and extending rearwardly to a bearing 42 and being operated by a hand wheel 43 which is connected with shaft 40 by suitable gearing 44, so that by turning hand wheel 43, shaft 40 will operate the worm gearing to revolve internal gear 33 and front wheel members attached thereto.

Secured to the spokes 20 of the wheel member 12 is a beveled gear 45 which meshes with a beveled pinion 46 secured to a vertical shaft 47, the lower end of shaft 47 being journaled in a bearing 48 on the webbed support 27, and the upper end of shaft 47 extends loosely through the 5th wheel 29 and carries a beveled gear 49. The beveled gear 49 is adapted to mesh with a beveled gear 50 or 51 which are rigidly mounted on a sleeve 52 which is splined on a shaft 53 which is driven from an engine 54 through the medium of a clutch 55, the rear end of the shaft 53 being journaled in a bearing 56, while its forward portion is supported in the sleeve 52, the sleeve 52 being journaled in bearings 57 on the cross bar 37. The sleeve 52 is slid in either direction by means of a forked bracket 58 on the end of a link 59 operated by a lever 60 and hand rod 61. Engine 54 through the medium of clutch 55 drives shaft 53 and through the medium of pinion 50 or 51, drives gear 49 and shaft 47, thus rotating pinion 46 which drives bevel gear 45 and rotates the two wheel members 12 and 13, the two wheel members being rigidly secured together by a bolt 62, the latter having shoulders 63 which form abutments against which the sleeve hubs 14 of the wheel members are secured by the nuts 63' on the bolt. The shoulders 63 space the sleeve hubs the proper distance apart to prevent undue friction on the flange 26 of stationary sleeve 25 and prevent lateral motion of the wheel members so that both wheel members turn as a single unit. The front wheel members 12 and 13 are driven in one direction by engaging pinion 50 with gear 49, while the reverse direction of drive is secured by sliding pinion 51 into engagement with gear 49 instead of pinion 50.

What I claim is:—

1. In a tractor, a frame, two wheel members, a frame supporting means supporting said frame and being revoluble thereon and extending between said wheel members, said wheel members being revolubly connected thereto, means rigidly securing said wheel members to each other, and driving means extending between said wheel members to a point between a wheel and the frame portion which is between the wheels for rotating the same on said frame supporting means, said driving means extending to the frame from a point above the wheels and being concentric with the axis of revolution of said frame supporting means with respect to the frame.

2. A stationary frame, a steering frame pivoted on the stationary frame, a pair of wheel members close together mounted on the pivoted frame, and gearing extending from the stationary frame at a point above the wheel members to between the wheels on the pivoted frame for driving the same.

In testimony whereof I have hereunto set my hand at Los Angeles, California, this 31st day of December, 1912.

PAUL WEEKS.

In presence of—
  G. T. HACKLEY,
  MARTHA M. LANGE.